United States Patent
Moon et al.

(10) Patent No.: US 10,660,328 B2
(45) Date of Patent: *May 26, 2020

(54) EXTREMELY FAST FREEZING, LOW-TEMPERATURE BLAST FREEZER

(71) Applicant: Bao Tran, Saratoga, CA (US)

(72) Inventors: William G. Moon, Provo, UT (US); William J. Hancock, Bellevue, CA (US); Steven V. Boyce, Spanish Fork, CA (US); Steven J. Parkinson, Clinton, CA (US)

(73) Assignee: Reflect Scientific, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,658

(22) Filed: Aug. 25, 2018

(65) Prior Publication Data
US 2019/0133110 A1 May 9, 2019

Related U.S. Application Data

(63) Continuation of application No. 15/296,009, filed on Oct. 17, 2016, now Pat. No. 10,188,098, which is a continuation-in-part of application No. 12/464,701, filed on May 12, 2009, now abandoned, and a continuation-in-part of application No. 12/574,670, filed on Oct. 6, 2009, now Pat. No. 8,448,454.

(51) Int. Cl.
| | | |
|---|---|---|
| *A01N 1/02* | (2006.01) | |
| *F25D 3/10* | (2006.01) | |
| *F25D 17/06* | (2006.01) | |
| *F25D 29/00* | (2006.01) | |

(52) U.S. Cl.
CPC .......... *A01N 1/0257* (2013.01); *F25D 3/102* (2013.01); *F25D 17/06* (2013.01); *F25D 29/001* (2013.01); *F25D 29/006* (2013.01); *F25D 2700/122* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,678,716 | A * | 7/1972 | Cobb ................. | E05B 65/0053 70/92 |
| 4,138,049 | A * | 2/1979 | McAlarney .......... | F25D 23/087 277/629 |
| 4,436,692 | A * | 3/1984 | Stenabaugh ....... | G21C 13/0285 376/204 |
| 4,741,172 | A * | 5/1988 | Aoki ........................ | A47F 3/00 62/248 |
| 5,163,301 | A * | 11/1992 | Cahill-O'Brien ..... | F25B 41/043 236/78 C |

(Continued)

*Primary Examiner* — Henry T Crenshaw
(74) *Attorney, Agent, or Firm* — Tran & Associates

(57) ABSTRACT

A freezer includes a plurality of shelves in an insulated payload bay; a plurality of evaporators coupled to the payload bay with a multiplicity of coolant tubes in each evaporator, wherein each tube enters and then exits the payload bay, further comprising one or more cryogenic valves coupled to the coolant tubes; a pump to force coolant flowing through the evaporators with a pressure of at least 90 psi to supply the coolant at each evaporator with at least 80 gallons per hour of coolant; and a plurality of fans to circulate cooled air in the payload bay.

14 Claims, 9 Drawing Sheets

(56) References Cited

U.S. PATENT DOCUMENTS

| | | | | |
|---|---|---|---|---|
| 5,267,443 | A * | 12/1993 | Roehrich | B60H 1/3202 62/50.3 |
| 5,287,705 | A * | 2/1994 | Roehrich | B60H 1/3202 62/50.3 |
| 5,568,800 | A * | 10/1996 | Einaudi | F02M 17/16 123/546 |
| 5,699,670 | A * | 12/1997 | Jurewicz | F25D 29/001 62/186 |
| 5,826,432 | A * | 10/1998 | Ledbetter | F25D 13/00 62/196.4 |
| 6,349,547 | B1 * | 2/2002 | Miller | F25B 27/00 62/402 |
| 10,188,098 | B2 * | 1/2019 | Moon | A01N 1/0257 |
| 2003/0033825 | A1 * | 2/2003 | Goosman | B60H 1/3232 62/239 |
| 2003/0051486 | A1 * | 3/2003 | Ursan | F04B 15/08 62/50.6 |
| 2003/0086338 | A1 * | 5/2003 | Sastry | G06F 19/3462 368/10 |
| 2003/0089493 | A1 * | 5/2003 | Takano | B60H 1/00914 165/202 |
| 2003/0091347 | A1 * | 5/2003 | Goto | G03C 1/49881 396/564 |
| 2003/0221726 | A1 * | 12/2003 | Semeia | B63C 11/2209 137/338 |
| 2004/0104654 | A1 * | 6/2004 | Lee | F25D 21/04 312/401 |
| 2005/0126630 | A1 * | 6/2005 | Swan | E03B 7/12 137/80 |
| 2005/0178285 | A1 * | 8/2005 | Beers | B60P 3/20 105/404 |
| 2005/0241333 | A1 * | 11/2005 | Hamilton | A01N 1/02 62/407 |
| 2005/0279119 | A1 * | 12/2005 | Sim | F25B 39/022 62/419 |
| 2006/0202042 | A1 * | 9/2006 | Chu | G06K 17/0022 235/492 |
| 2007/0157645 | A1 * | 7/2007 | Anell | F25D 17/065 62/187 |
| 2008/0276540 | A1 * | 11/2008 | Kim | F25D 23/087 49/478.1 |
| 2009/0273265 | A1 * | 11/2009 | Aragon | F25D 3/125 312/405 |
| 2013/0247605 | A1 * | 9/2013 | Laudet | B60H 1/00378 62/239 |
| 2015/0137674 | A1 * | 5/2015 | Choi | F25D 23/04 312/404 |
| 2015/0343881 | A1 * | 12/2015 | Farrington | B60H 1/3233 62/121 |
| 2016/0356517 | A1 * | 12/2016 | Kim | F24F 5/0035 |
| 2018/0311659 | A1 * | 11/2018 | Efinger | B01L 1/025 |

* cited by examiner

EXTREMELY FAST FREEZING, LOW-TEMPERATURE BLAST FREEZER

FIELD OF INVENTION

The present invention relates to high speed cooling freezers.

BACKGROUND OF THE INVENTION

Many applications require the specific capability of freezing a product in an extremely short time. Exemplary users include companies that require plasma or blood related products to be frozen quickly and completely to −40 C. Such companies contain their product in a multiplicity of specially formulated plastic bags that contain between 250 cc and 500 cc of plasma or blood related products. These companies may freeze up to 100 bags simultaneously, placing approximately 10 bags on a tray and up to 10 trays in the freezer. Traditionally, cooling devices known in the industry as Blast Freezers are used with the unique capability of freezing the customer's products at a substantially faster rate than standard laboratory or storage freezers.

Typically, state of the art Blast Freezers are mechanical, with compressors and refrigerants. The main drawback is that the boiling point of the refrigerant is approximately −100 C which severely limits the ability to freeze product quickly. As an example, these freezers are unable to freeze a batch of 100 bags to −40 C in less than 2 hours. The present invention will perform that task in one hour, which is one-half the time of present day Blast Freezers. The freezer also has the capability of rapidly heating product to room temperature or higher.

SUMMARY

In one aspect, a freezer includes a plurality of shelves in an insulated payload bay; a plurality of evaporators coupled to the payload bay with a multiplicity of coolant tubes in each evaporator, wherein each tube enters and then exits the payload bay, further comprising one or more cryogenic valves coupled to the coolant tubes; a pump or bulk liquid nitrogen storage system to force coolant flowing through the evaporators with a pressure of at least 90 psi to supply the coolant at each evaporator with at least 80 gallons per hour of coolant; and a plurality of fans to circulate cooled air in the payload bay.

In another aspect, a freezer includes
1 a liquid Nitrogen inlet capable of convenient attachment to a customer's liquid Nitrogen supply;
2 a cryogenic flow system that operates at a predetermined Nitrogen flow;
3 a payload bay with removable shelves;
4 a plurality of evaporators inside the payload bay.
5 A plurality of fans that distribute the cooled air from the evaporators to the payload bay.
6 a fan and evaporator support structure with a multiplicity of holes that selectively direct the cooled airflow to provide even cooling throughout the payload bay.
7 a thermal box immediately outside the evaporators and payload bay, that effectively thermally seals the payload bay from the outside environment, significantly reducing heat gain;
8 an electronic controller that maintains a set point for the payload bay, determined by the operator between approximately 20 degree C. and −150 degree C.;
9 a pneumatic latch that secures the freezer;
10 a pneumatic rubber seal that provides an airtight seal for the payload bay; and
11 electronics and mechanics that controls payload bay temperatures consistently within +/−3 degree C. of the set point throughout the shipment duration.

In another aspect, a freezer system is designed for freezing a customer's product at an extremely fast rate compared to prior art products, to temperatures as low as −160 C. The freezer is comprised of a large payload bay, an inlet for the customer's supply of a cryogenic liquid such as Nitrogen, evaporators inside the payload bay, and a plurality of fans adjacent to the evaporators, that deliver extremely cold air to all surfaces of the customer's product for fast convective cooling. Further, the temperature is controlled at the exhaust port of the freezer with a cryogenic solenoid valve.

In another aspect, a Blast Freezer system is designed to operate at temperatures as low as −160 C by using additional features to further reduce heat gain caused by the large differential temperature between the payload bay and the environment. A 2-inch rubber pneumatic seal is strategically placed to not only seal the gap between the main door and the thermal box but also to seal the gap between the inner door and the thermal box, and apply significant force to the inner door. This force prevents thermal bending of the inner door at extremely low temperatures, thus continually maintaining a seal between the inner door and the payload bay during large thermal contraction of the door and payload bay.

When the customer requirement is to heat product from these extremely low temperatures to room temperature or even warmer, a heating system has been designed for fast temperature recovery. Electric pads in the airflow path reduce the heating time. In addition multiple heat tubes, similar in diameter to the copper cooling tubes are placed into the evaporator fins for heating. Thermodynamically, the properties for cooling also apply to heating, which makes the heat tube location very efficient. As many as 90 heat tubes are installed in the evaporators to provide even heating throughout the payload bay.

Advantages of the system may include one or more of the following. The preferred embodiment has the capability of reducing the freeze time of about 100 bags to about 1 hour, which is one-half the time of conventional freezers. Further, the payload bay has 20 shelves and is capable of freezing 200 bags in one batch. These almost unheard of freezing times are accomplished by design: 1) The coolant is Liquid Nitrogen, having a boiling point of −196 C, almost 100 C colder than the refrigerants used in mechanical freezers; 2) The supply pressure of the Liquid Nitrogen coolant is approximately 100 psi, which is much higher than conventional Nitrogen freezers, thus significantly increasing the coolant flow; and 3) The convective cooling properties of the freezer are greatly enhanced through the addition of a plurality of fans inside the payload bay. 4) The coolant flow is increased to 80 gallons per hour by connecting the evaporator coils in parallel, thus providing multiple paths for the coolant through the Blast Freezer. Also, larger diameter copper tubing aids in higher coolant flow.

When the product inside the payload bay requires rapid heating, electric pads in the airflow path reduce the heating time. In addition, heat tubes within the evaporators evenly and quickly transfer heat to product.

DESCRIPTION

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in virtually any appropriately detailed system.

Figure 1:
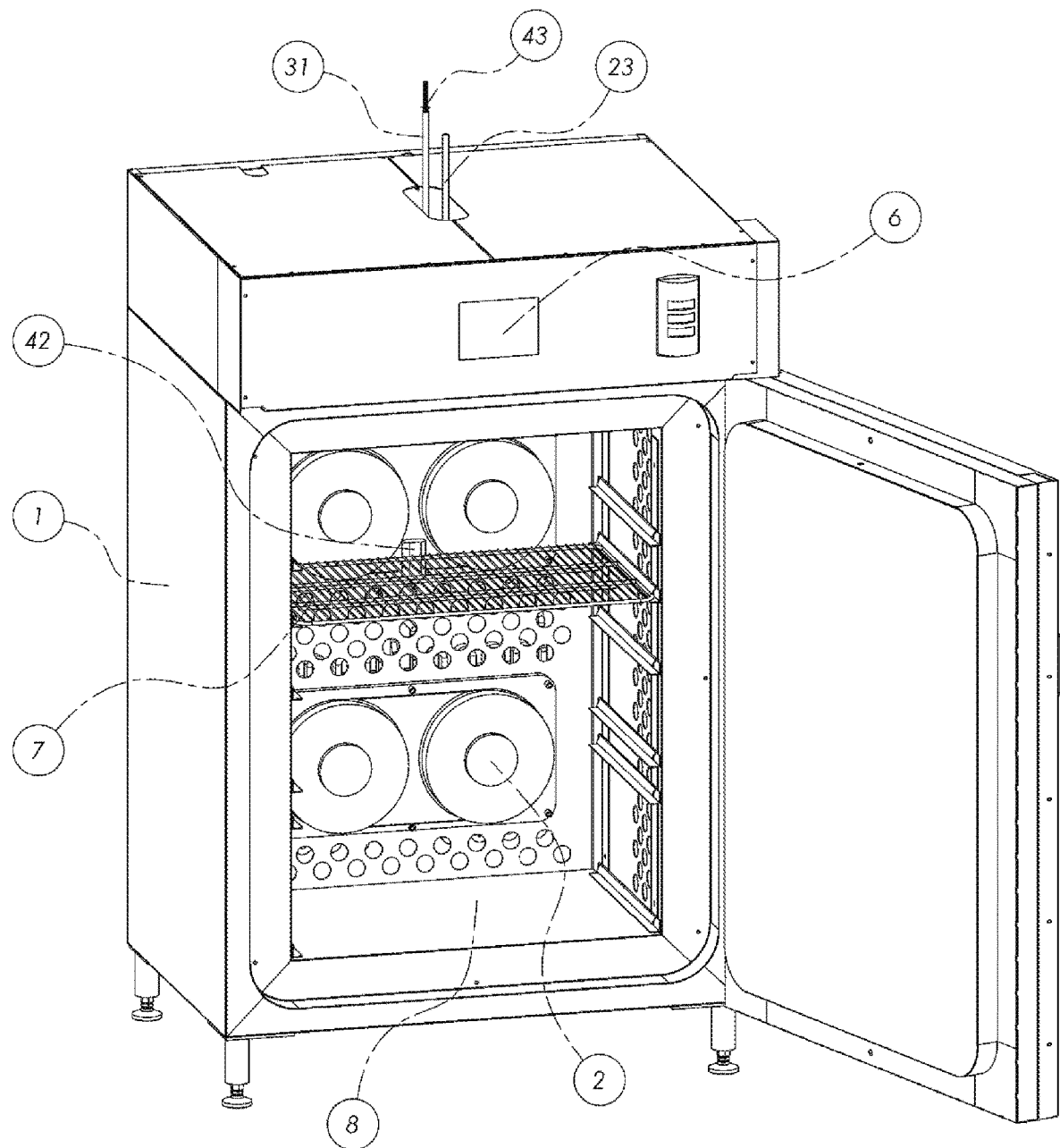
FIG. 1 is an exemplary 3D perspective view of the front of a Blast Freezer.
Figure 2:
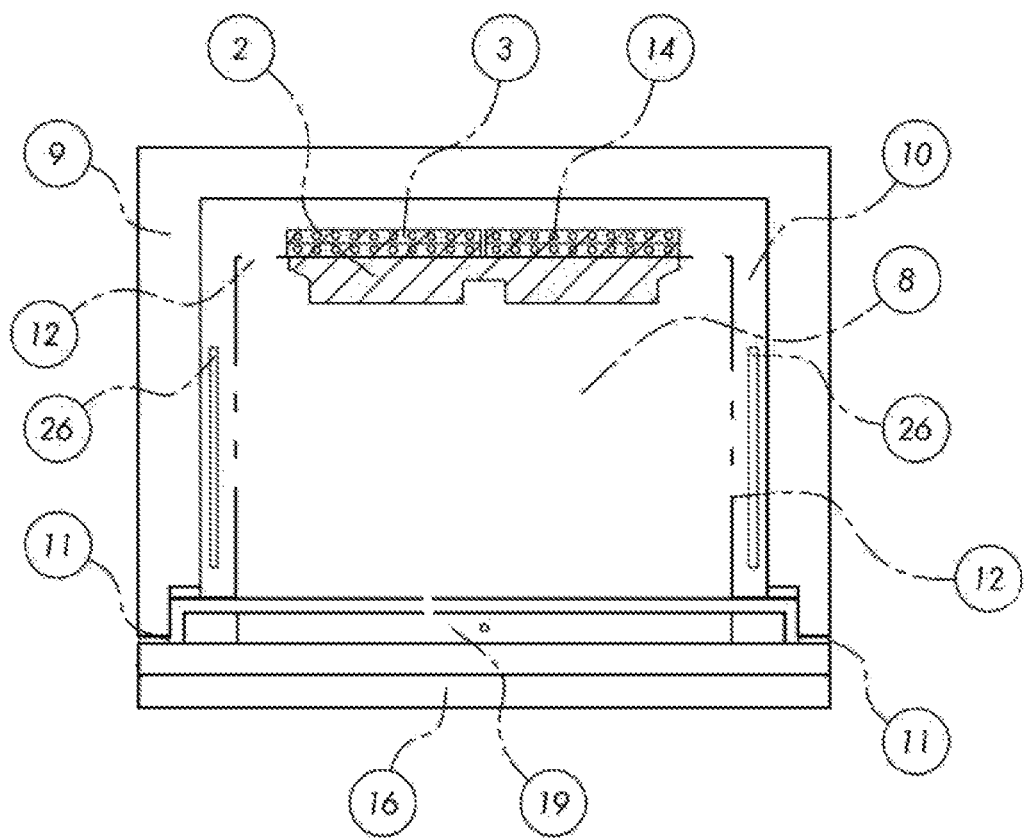
FIG. 2 is an exemplary top view of the Blast Freezer.
Figure 3:
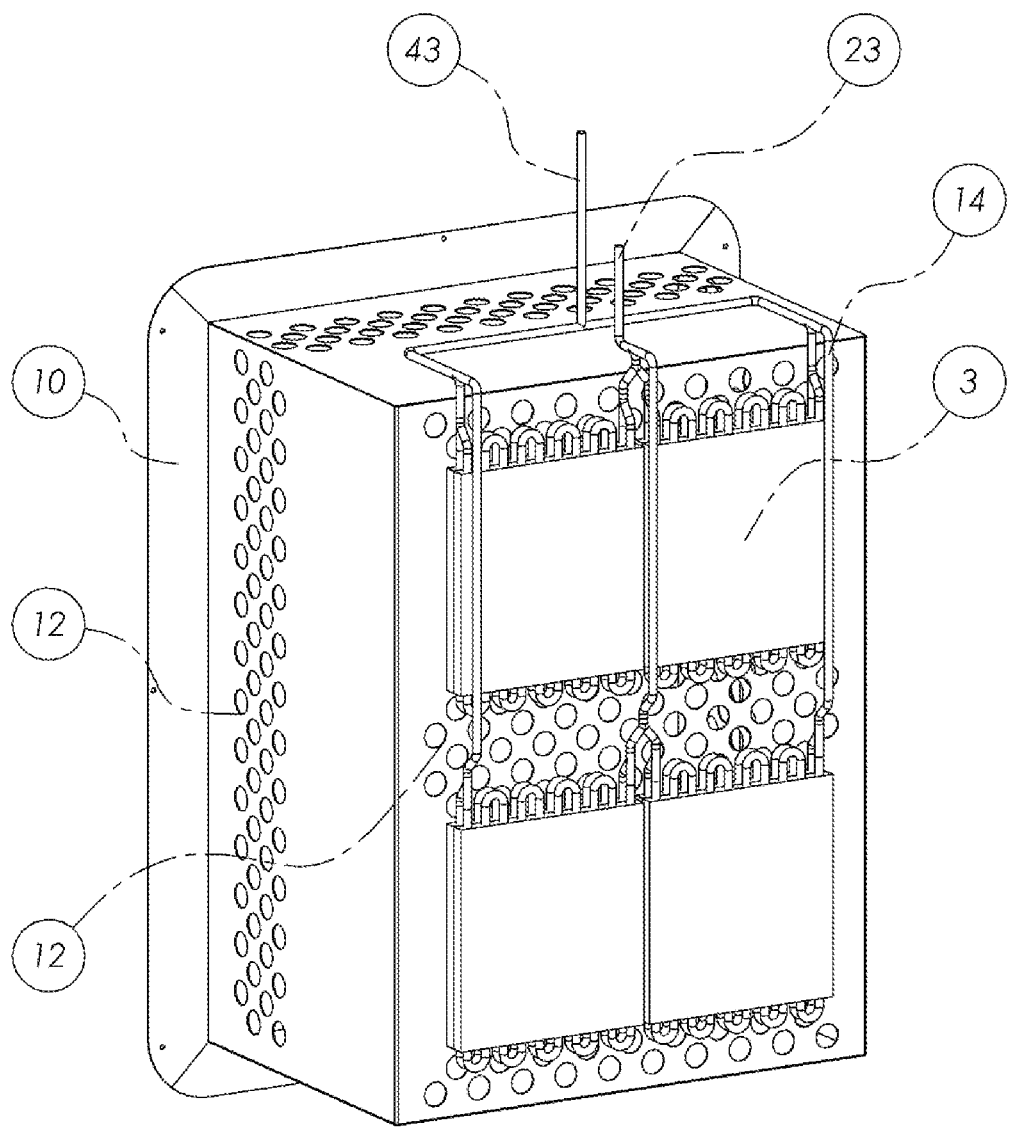
FIG. 3 is an exemplary 3D view of the back inside of the Blast Freezer.
Figure 4:
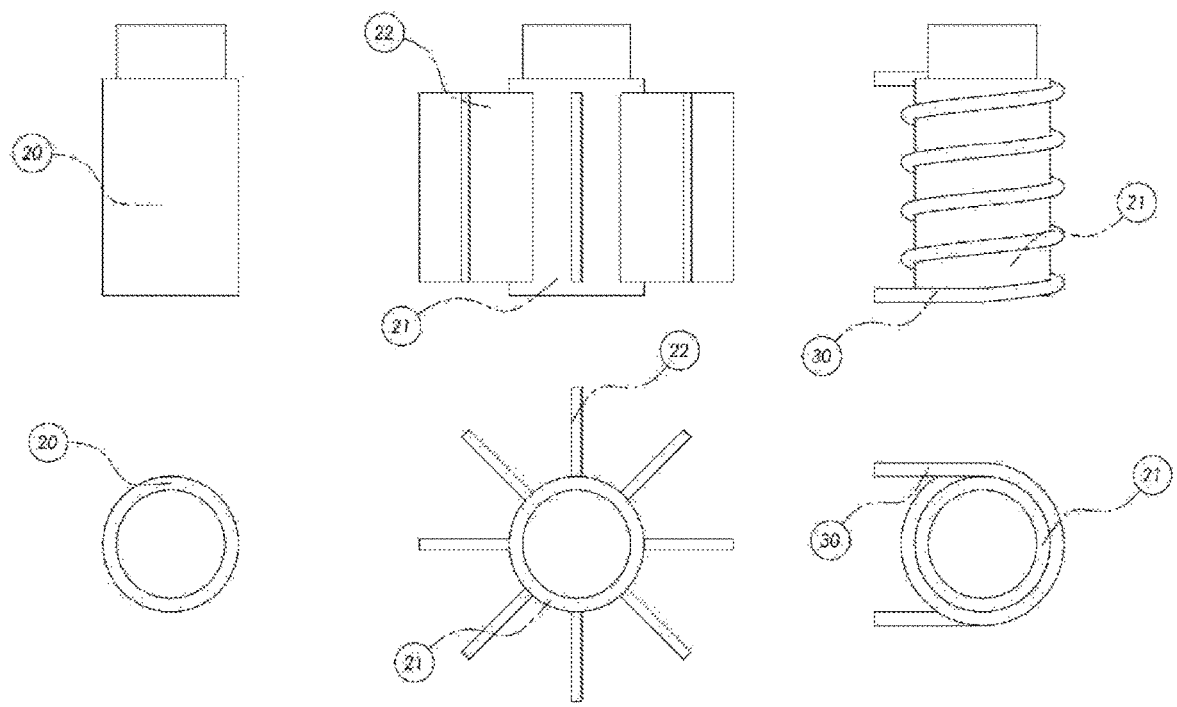
FIG. 4 is an exemplary drawing of the safety valve heating fins.
Figure 5:
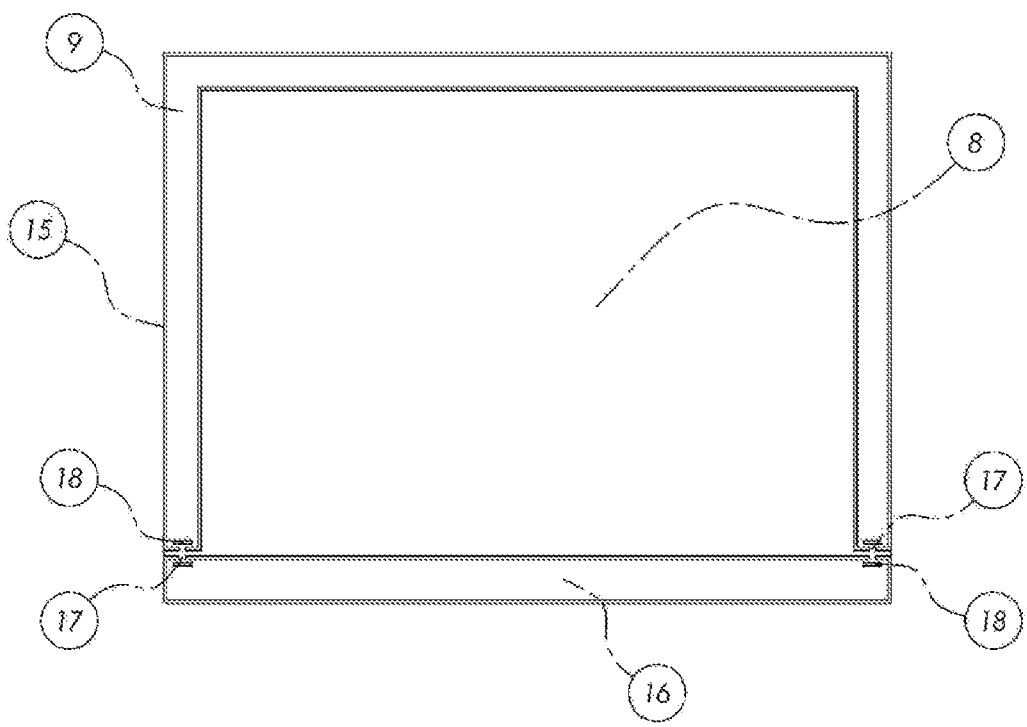
FIG. 5 is an exemplary cross section top view of the thermal barrier.

Now referring to FIGS. 1 through 3, the preferred embodiment is a freezer system 1 with a plurality of shelves 7, connected to a liquid Nitrogen source 43, and set to a pressure of 100 psi, for example. In contrast, conventional liquid Nitrogen freezers are typically set to 35 psi. The preferred embodiment, with 3 times the pressure, will supply coolant at up to 9 times the flow of conventional freezers. The 100 psi pressure will cause flows as high as 80 gallons per hour of liquid Nitrogen, thus providing extremely fast cooling. In one embodiment, a pump is used to force coolant flowing through the evaporators with a pressure of at least 90 psi to supply the coolant at each evaporator with at least 80 gallons per hour of coolant. The Nitrogen source is attached to the freezer 1 at a liquid nitrogen inlet 31. The coolant flows to a plurality of evaporators 3 that have a multiplicity of coolant tubes 14 in each evaporator, thus maximizing the transfer of heat from the Liquid Nitrogen to the payload bay 8. The copper tube then exits the payload bay, where the cryogenic fluid is controlled with one or more cryogenic solenoid valves 5. The exhaust port 23 is then attached to a customer portal that provides a pathway for the Nitrogen gas to flow outside the building.

As a means of significantly improving the freezing rat e, multiple fans 2 with typical airflows of 1,000 CFM rapidly distribute air around the customer's containers, thus increasing the cooling convection properties of the freezer. Also, vent holes 12 are strategically placed as a means of ensuring uniform temperature throughout the payload bay.

A separate compartment 10, located between the payload bay and the outside environment, of between 2 and 4 inches thick contains insulation 9 that substantially reduces the heat gain of the payload bay from the environment.

A thermocouple, inside the payload bay, measures the temperature at all times and sends a signal to the controller 6, where it is carefully monitored and the temperature is controlled. When the set point is reached, the controller 6 will stop the flow of liquid Nitrogen through the evaporators 3 by turning the cryogenic solenoid valves 5 off. The cryogenic solenoid valves 5 controls the Nitrogen flow in a location that is considered unique by those familiar with the state of the art.

Typically, one of the cryogenic solenoid valves 5 is located in the coolant path between the source and the freezer 1. Said valve 5 is located at the exhaust port 23 of the freezer, which provides equivalent control, but provides a substantially warmer environment for the valve, thus increasing the reliability and life of the valve.

The controller 6 monitors the payload bay temperature via a thermocouple 42 and will use algorithms familiar to those skilled in the art of feedback control systems, such as PID control, to maintain the set point within a reasonable limit, such as +/−3 C in the preferred embodiment.

A further advantage of the system is the capability of cooling the room where the freezer is located. All mechanical freezers accomplish cooling by transferring heat from the payload bay to the surrounding environment, thus heating the room. Typically, a room with several mechanical freezers requires a significant air conditioning system to make the room bearable for employees, and to prolong the life of other instruments and equipment in the room. However, in the preferred embodiment, the exhausting Nitrogen is typically of a sufficiently cold temperature, approximately −100 C, that it is an excellent source for providing the equivalent of an air conditioner for the room. The Nitrogen gas flows through a multiplicity of coolant tubes 14 within the Blast Freezer 1 then through a heat exchanger 25 located on the top of the Blast Freezer 1. The heat exchanger 25 is similar to an air conditioner evaporator coil. The Nitrogen gas flows from the solenoid control valve through tubes 14 and through the heat exchanger 25. An external fan 24 forces air through said heat exchanger 25, where the air from the outside environment is cooled. Another advantage of the Blast Freezer is the capability of heating the payload bay. Electrical heating pads 26, such as Silicone rubber heaters are located in the separate compartment 10. When the customer sets the controller 6 to a temperature that is warmer than the current payload bay temperature, the heating pads are energized and continue to heat until the desired set point is reached.

A further advantage of the Blast Freezer is the improvement in efficiency of cooling compared to other Nitrogen freezers. Conventionally, the stainless steel walls 15 of the freezer body and main door 16 are a conductive thermal path for environmental heat to pass through the exterior walls and into the payload bay 8. This problem is referred to as a "thermal short" by those skilled in the art of thermodynamics. The preferred embodiment, however, decreases the Nitrogen usage rate by as much as 30%. To eliminate this heat gain, a thermal barrier or disconnect decouples the sheet metal. The thermal barrier is a gap 17 in the sheet metal approximately ¼ inch wide in the preferred embodiment, eliminating the metal conductive thermal path. A non-metal material 18, such as a glass-based epoxy resin laminate, attached to both sides of the gap 17, provides structural support.

Typically, there is also significant heat gain through the gasket between the main door 16 and the freezer. As a means to reduce said heat gain, a rubber pneumatic seal 11 is placed between the main door 16 and the payload bay 8. Said seal 11 is controlled by pneumatic valve 28 and inflated from the Nitrogen gas that is readily available at all times, since it is a by-product of the cooling process. A further reduction in heat gain is accomplished with an additional impediment to the heat flow by adding an inner door 19 interior to the main door 16.

A feature of the Blast Freezer is a means of operating the cooling system in event of power loss. Deep cycle batteries provide immediate backup energy. Further, in the event of prolonged power loss for several days, a mechanical valve 27 located in parallel with the cryogenic solenoid valve 5 provides a means for the operator to manually regulate the freezer temperature.

A safety valve 20 is used to prevent excessive pressures in the system and is generally used in the industry for this type of application. However, a common problem is that extremely cold temperatures of the liquid Nitrogen can cause humidity or water vapor to accumulate and freeze. This ice buildup can keep safety valve 20 from closing. This failure can reduce pressure far below the normal operating pressure and needlessly waste large amounts of Nitrogen.

To reduce this problem, heating fins 22 are added to the safety valve 20 in the preferred embodiment. These heating fins 22 keep the temperature of the safety valve 20 warmer during pressure relief, thus significantly reducing the problem.

Another method to reduce this problem is by placing electrical heat tape 30 around the safety valve 20. The electrical heat tape 30 may be thermally controlled to operate only when necessary, which is when the temperature of the safety valve 20 drops below freezing.

Another method to warm the payload bay 8 is by placing heating tubes 32 within the evaporators 3.

As a further means of improving reliability the preferred embodiment has no refrigeration compressor, common to most prior art freezers, thus alleviating wear problems associated with the multiplicity of moving parts. To increase reliability, mechanical valve 27 is used in parallel with cryogenic solenoid valve 5 as a backup control.

In one embodiment, a Blast Freezer 1 system includes a liquid Nitrogen inlet 31 capable of convenient attachment to a customer's liquid Nitrogen supply and a cryogenic flow system that operates at significantly higher Nitrogen flow than conventional freezers. The system includes a payload bay 8 with removable shelves 7, a plurality of evaporators 3 inside the payload bay 8; and a plurality of fans 2 that distribute the cooled air from the evaporators 3 to the payload bay 8. A fan 2 and an evaporator support structure have a multiplicity of holes 12 that selectively direct the cooled airflow to provide even cooling throughout the payload bay 8. A seperate compartment 10 is provided immediately outside the evaporators 3 and payload bay 8 that effectively thermally seals the payload bay 8 from the outside environment, significantly reducing heat gain. The system includes pneumatic latches 29 that secure the main door 16. A rubber pneumatic seal 11 provides an airtight seal between the main door 16 and payload bay 8. A further improvement is increasing the rubber pneumatic seal 11 width from 1 inch to 2 inches. The additional rubber pneumatic seal 11 width covers the gap between the thermal box 10 and the inner door 19. When the rubber pneumatic seal 11 is inflated, after pneumatic latches 29 have secured the main door 16 closed, a large force is applied to the inner door 19. For example, at 12 psi in the rubber pneumatic seal 11, the total force on the freezer 1 is over 2,600 pounds. A minimum of 1,000 pounds of that force is directed at the inner door 19. This force reduces warping of the inner door 19 and makes a tight seal.

An electronic controller 6 is provided that maintains a set point for the payload bay 8, determined by the operator between 20 C and −150 C. The electronics control payload bay temperatures consistently within +/−3 C of the set point throughout the shipment duration.

Figure 6:
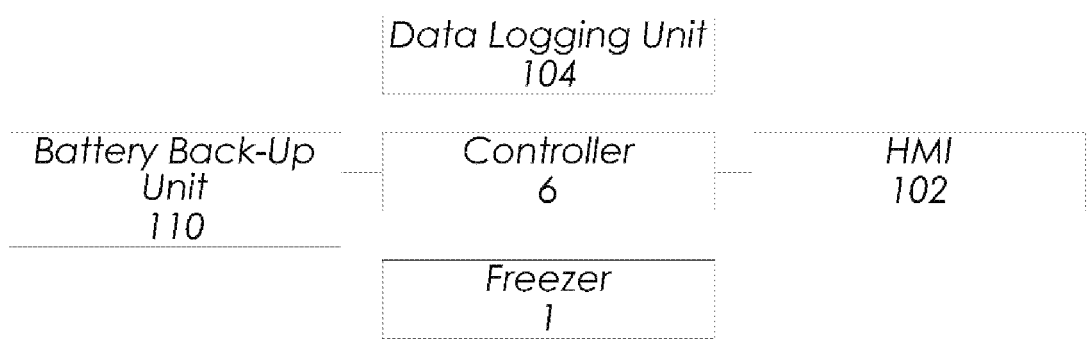
FIG. 6 shows an exemplary controller with battery backup system for the Blast Freezer.
Figure 7:
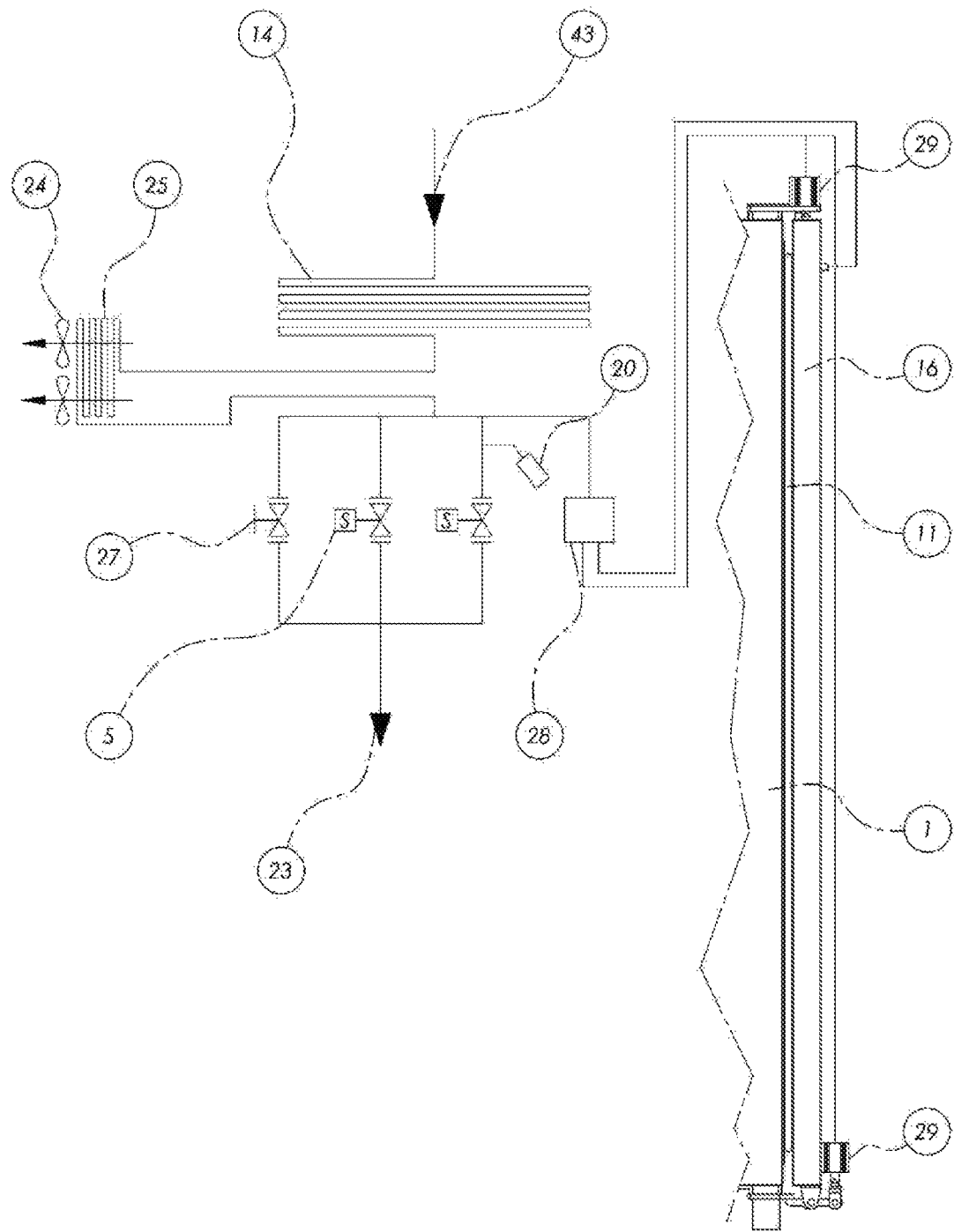
FIG. 7 shows a diagram of redundancy operations in the shipping unit.
Figure 8:
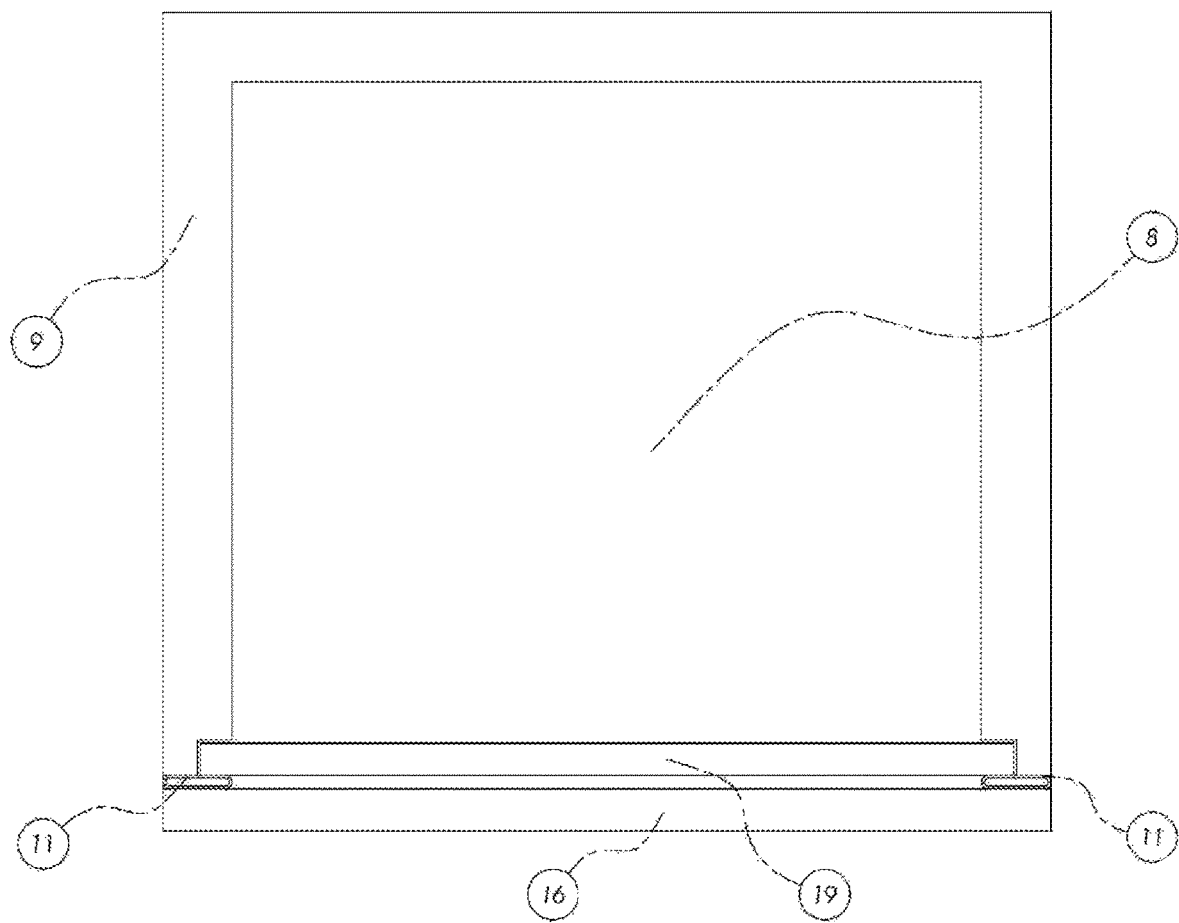
FIG. 8 shows an exemplary top view of the sealing mechanisms for the Blast Freezer.
Figure 9:
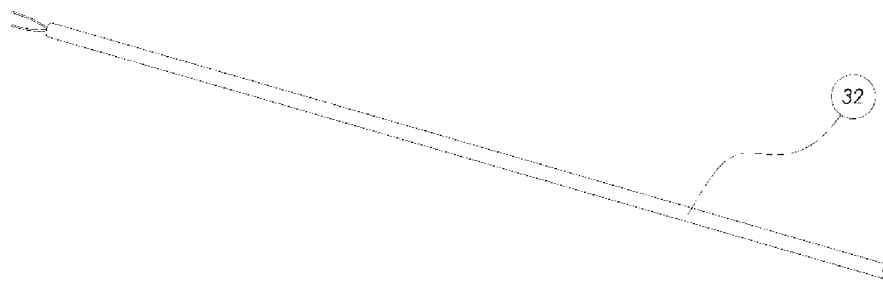
FIG. 9 shows an exemplary drawing of a heat tube.
Figure 10:
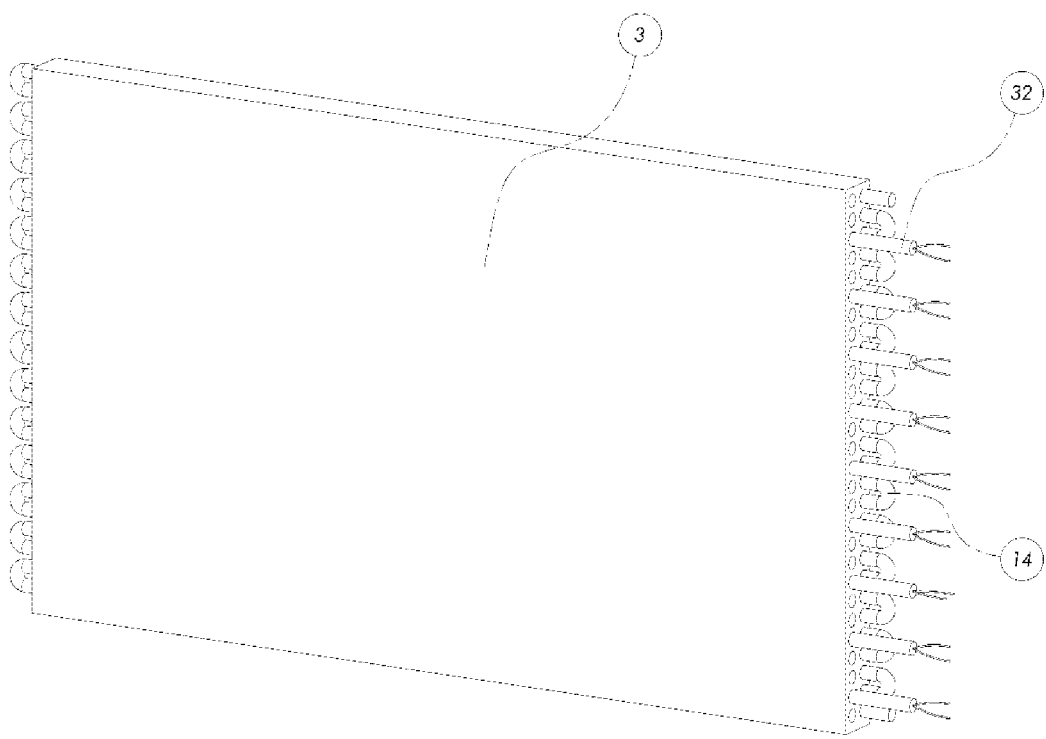
FIG. 10 shows an exemplary drawing of the evaporator with heat tubes installed.

FIG. 6 shows an exemplary Blast Freezer 1 with a controller 6 and a battery back-up unit 110 The controller 6 includes an interactive Human Machine Interface or HMI 102. The HMI 102 has a touch screen display. Said electronics also includes a data logging unit 104 with real time data, plotted on the display and recording temperature vs time. The electronics also includes the capability to transmit data logging information. The payload bay temperature control is provided by a cryogenic solenoid valve 5 that is precisely controlled by the electronics. Further, said temperature control is achieved through the use of PID or another algorithm known to those skilled in the art. Deep cycle batteries in the battery 110 can provide uninterrupted power in the event of AC power loss. Additional customer product thermal safety is provided by an emergency mechanical valve 27 that regulates freezer temperature. A pneumatic latch 29 and pneumatic rubber seal 11 can be used and can be powered by the pressure derived from the Nitrogen exhaust gas. The newly developed safety valve 21 has a mechanism to prevent a frozen-open valve condition, through the attachment of heating fins 22 to the outside diameter and/or electrical heat tape 30. The assembly has a net thermal effect of reducing the temperature of the surrounding environment, rather than increasing the temperature, which occurs with prior art mechanical freezers. The cryogenic solenoid valve 5 is placed in the exhaust path of the Nitrogen gas. Said location provides a warmer temperature location and promotes longer valve operating life than the standard location that is on the substantially colder incoming side of the freezer. The system is emission free and contains no polluting refrigerants such as CFCs or HCFCs. The entire cooling system is highly reliable due to almost no moving parts. The system has the capability of heating the payload bay 8. The entire Nitrogen flow is a closed system and the liquid Nitrogen and the Nitrogen gas never come in direct contact with the customer's product or the employees.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A system, comprising:
   a plurality of shelves in a payload bay surrounded by insulation acting as a thermal barrier between the payload bay and the outside environment;
   a plurality of evaporators coupled to the payload bay with a multiplicity of coolant tubes in each evaporator, wherein the coolant tubes cool the payload bay in parallel, further comprising one or more cryogenic solenoid valves coupled to the coolant tubes;
   a liquid nitrogen source to circulate a predetermined amount of coolant at a predetermined pressure to drive a predetermined coolant flow through the plurality of evaporators with coolant tubes and cool the payload bay to −150 degree Celsius in one hour;
   a thermal barrier isolating thermal flow between the payload bay and a main door where the thermal barrier comprises a gap with a non-metal material attached to both sides of the gap;
   an inner door and a pneumatic seal providing an airtight seal between the main door and the payload bay;
   a plurality of fans to circulate convective cooled air in the payload bay; and
   an external fan that forces air through a room heat exchanger.

2. The system of claim 1, comprising one or more vent holes placed at predetermined locations on the payload bay.

3. The system of claim 1, comprising a separate compartment located between the payload bay and the outside environment with an insulation of between 2 and 4 inches thick.

4. The system of claim 1, comprising a controller coupled to a thermocouple inside the payload bay.

5. The system of claim 4, wherein the controller performs proportional-integral-derivative (PID) control to maintain a set point within a predetermined limit.

6. The system of claim 1, wherein the one or more cryogenic solenoid valves are located at an exhaust port.

7. The system of claim 1, comprising one or more heating tubes within one or more evaporators.

8. The system of claim 1, comprising a mechanical valve located in parallel with one or more cryogenic solenoid valves to manually regulate payload bay temperature.

9. The system of claim 1, comprising a battery to provide backup power.

10. The system of claim 1, wherein a safety valve is connected to one or more coolant tubes.

11. The system of claim 10, wherein the safety valve has one or more heating fins or electrical heat tape coupled to it.

12. The system of claim 1, comprising one or more pneumatic latches.

13. The system of claim 12, wherein the one or more pneumatic latches and a rubber pneumatic seal are powered by gaseous nitrogen.

14. A system, comprising:
a liquid nitrogen inlet to receive liquid nitrogen;
one or more coolant tubes that operate at a predetermined liquid nitrogen pressure;
a payload bay;
one or more evaporators inside the payload bay;
one or more fans that distribute cooled air from the one or more evaporators to the payload bay;
one or more vent holes;
insulation surrounding the payload bay;
a controller that maintains a temperature set point for the payload bay;
a thermal barrier isolating thermal flow between the payload bay and a main door where the thermal barrier comprises a gap with a non-metal material attached to both sides of the gap;
an inner door and a pneumatic seal providing an airtight seal between the main door and the payload bay;
one or more pneumatic latches to secure a main door; and
a rubber pneumatic seal that provides an airtight seal for the payload bay and the main door.

* * * * *